Oct. 23, 1951     J. KRAL     2,572,812
FASTENING DEVICE
Filed Jan. 12, 1946
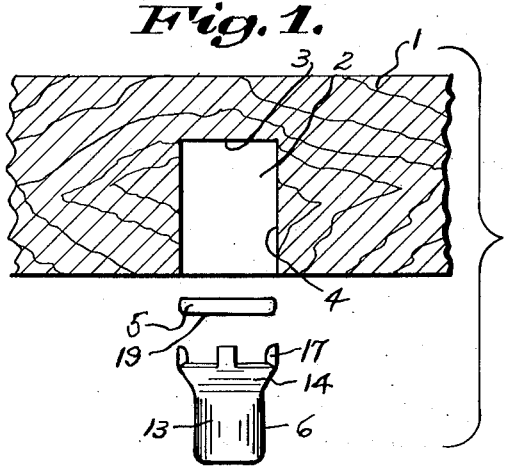
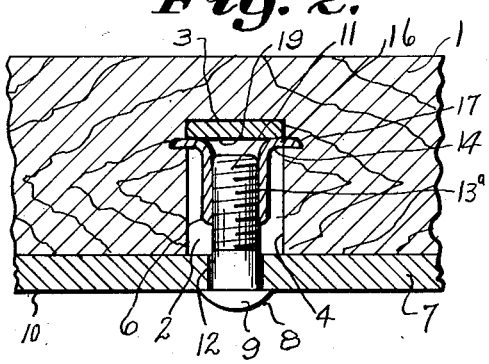
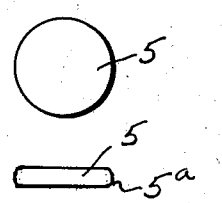
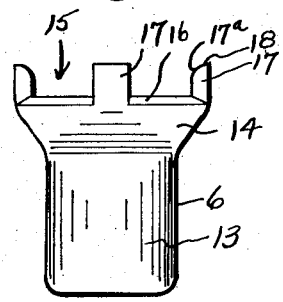
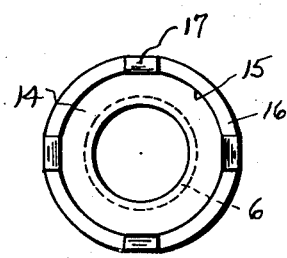
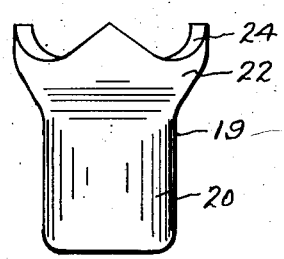
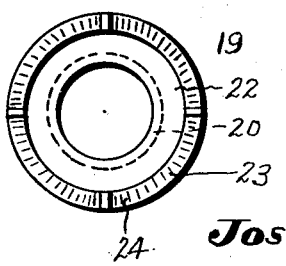
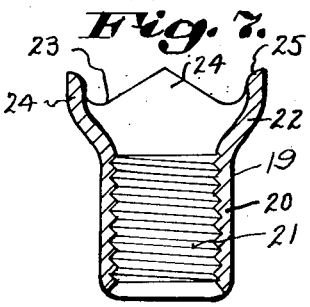
Inventor
Joseph Kral.
By John Todd
Attorney Patented Oct. 23, 1951

2,572,812

UNITED STATES PATENT OFFICE 2,572,812

FASTENING DEVICE

Joseph Kral, Cambridge, Mass., assignor to United-Carr Fastener Corporation, Cambridge, Mass., a corporation of Massachusetts Application January 12, 1946, Serial No. 640,693

1 Claim. (Cl. 151—33)

This invention relates to a fastening device of the type wherein one unit of the device is anchored within an opening of a supporting part in position for cooperation with a complementary fastener unit to be engaged therewith.

More specifically the preferred embodiments of my invention aim to provide a nut unit designed to be deformed or expanded through engagement with an anvil member disposed in the bottom of a support opening so as to secure the nut unit in firm fastened engagement with the wall surrounding the opening of the support.

Other objects of the invention will be apparent to persons skilled in the art from a consideration of the accompanying drawing and annexed specification illustrating and describing preferred embodiments of the invention.

Referring to the drawing:

Fig. 1 is a disassembled side elevation of the parts of a representative installation comprising a support, an anvil member and a nut member;

Fig. 2 is a vertical sectional view of the fastening device installation according to the invention;

Fig. 3 is a front and side elevation of the anvil of the fastening device;

Fig. 4 is a side elevation of the nut unit of the fastening device;

Fig. 5 is a top elevation of the nut unit of the fastening device;

Fig. 6 is a side elevation of a modified form of the nut unit of the fastening device;

Fig. 7 is a longitudinal sectional view of the nut unit shown in Fig. 6; and

Fig. 8 is a top elevation of the nut unit shown in Fig. 6.

Referring further to the drawing I have illustrated in Figs. 1 and 2 a supporting structure 1 which may be of wood, thermoplastic material and the like, having an opening 2 providing a bottom wall 3 and a side wall 4 adjacent the sides of the opening 2.

The form of fastener device illustrated in Figs. 1–5 comprises a circular metal disc 5 which is disposed adjacent the bottom wall 3 of the opening 2 in the assembly of the parts and a nut unit 6 which is moved into the opening 2 into engagement with the anvil member 5 and deformed thereby to engage the wall 4 surrounding the opening 2 so as to be firmly secured to the support 1. With the nut member 6 secured in position within the opening 2, another part such as a sheet metal panel 7 (Fig. 2) may be secured to the support 1 through means such as a threaded member 8 having a head 9 engaging an outer surface 10 of the panel 7 and a threaded shank 11 extending through an opening 12 of the panel into threaded engagement with the nut member 6 as illustrated in Fig. 2.

The anvil member 5 is in the form of the relatively thin metal disc which is preferably circular in shape. The disc 5 is preferably coined slightly on its edges as at 5a to facilitate passage of the disc to the bottom of the opening 2 when the disc is dropped into the opening in assembly of the parts.

The nut unit 6 is preferably drawn from a single piece of sheet metal and provides a barrel portion 13 which is internally threaded as at 13a (Fig. 2). One end of the barrel 13 has an integral cone-shaped attaching portion 14, the diameter of which progressively increases from its point of junction with the barrel 13 to its open end 15. The attaching portion 14 provides adjacent its opening end 15 a circumferential edge 16 which preferably extends obliquely relative to the normal axis of the nut member for a purpose to be described. The edge 16 has a predetermined diameter substantially equal to the diameter of the opening 2 of the support enabling the attaching portion to be moved readily into the opening 2 so as to engage the disc member 5 in initial assembly of the part. The attaching portion provides four lug-shaped elements 17 which are integrally joined to the edge 16 and which extend outwardly from the edge 16 in a plane substantially normal to that of the axis of the nut member. The elements 17 may be slightly bevelled as at 17a on their inner surfaces adjacent their outermost edges 18 (Fig. 4).

The nut member 6 is applied to the support by moving the attaching portion 14 into the opening 2 of the support to engage the outermost ends of the lug elements 17 with the front surface 19 of the disc 5. Thereafter pressure is applied to the nut member by any suitable tool in the direction of the disc 5 causing the lug elements 17 and material of the cone-shaped portion 14 adjacent the edge 6 to be expanded or flared outwardly so as to embed the lug elements 17 and in normal application the edge 16 in the wall of the opening 2 as shown in Fig. 2. By this action the edge 16 assumes a substantially flat form so that its plane lies substantially perpendicular to the normal axis of the nut member. The lug elements 17 which extend a greater distance into the wall 4 of the opening 2 than the edge 16 operate not only to assist in holding the nut in fastened position, but also to prevent rotation of the nut member during application of a threaded member thereto.

In Figs. 6-8 there is illustrated a modified form of nut member 19 comprising a barrel portion 20 internally threaded at 21 (Fig. 7). The nut member 19 has a generally cone shaped attaching element 22 integrally joined to one end of the barrel portion 20. Integral with the normal edge 23 of the attaching element 22 adjacent to and surrounding the open end of the attaching element 22 are lug elements 24 which extend from the edge 23 in a direction away from the barrel portion 20. The attaching element preferably has four lug elements 24 each of which is substantially triangular in form and bevelled slightly as at 25 Fig. 7 on its inner flat surface adjacent its outermost end.

In moving the nut unit 19 against the anvil 5 the lug elements 24 which may be inclined outwardly slightly with respect to the normal axis of the nut unit are cammed toward flattened position in a similar manner to that described in connection with the lug elements 17 of the first form of nut unit so as to embed themselves in the wall of the opening. The lug elements 24 as a result of their triangular shape provide more material at their point of junction with the normal edge 22 of the attaching element than the lugs 17 of the first form of nut unit and may thereby be less likely to break during the flattening operation. Furthermore the triangular-shaped elements 24 are less difficult to tool than the generally rectangular elements 17.

While I have illustrated and described a preferred embodiment of my invention I do not wish to be limited thereby because the scope of my invention is best defined by the following claim.

I claim:

A fastener installation comprising: a support having a cavity opening on one face and bottom and sidewalls for said cavity; an anvil member disposed within said cavity and having one face in engagement with the bottom wall of said cavity, a flat surface opposite said face, and peripheral surface disposed adjacent the sidewalls of said cavity; and a fastener member including a thread-engaging barrel portion and a deformable attaching portion, said attaching portion including an outwardly flaring hollow deformable portion integrally connected to one end of said barrel portion and a plurality of circumferentially spaced lug elements normally extending generally parallel to the axis of said barrel portion from the outer circumferential edge of said outwardly flaring portion, said lug elements normally presenting their free outer ends to said flat surface of said anvil member adjacent the periphery thereof, said ends normally presenting edges and surfaces to said flat surface inclined angularly thereto from the outer edges of said ends, in assembled position said attaching portion being deformed against said flat surface of said anvil member with an outer circumferential portion of said flaring portion and said lug elements extending radially outward against said flat surface in a plane substantially parallel thereto and with the outer circumferential edge of said flaring portion in biting engagement with said sidewalls of said cavity and said lug elements in penetrating engagement with said sidewalls.

JOSEPH KRAL.

REFERENCES CITED

The following references are of record in the file of this patent:

UNITED STATES PATENTS

| Number | Name | Date |
| --- | --- | --- |
| 412,243 | Dion | Oct. 8, 1889 |
| 414,755 | Cummings | Nov. 12, 1889 |
| 843,720 | Waddell et al. | Feb. 12, 1907 |
| 1,150,358 | Gilmer | Aug. 17, 1915 |
| 1,433,411 | Plant | Oct. 24, 1922 |
| 1,568,433 | Wheeler et al. | Jan. 5, 1926 |
| 1,680,905 | Mower | Aug. 14, 1928 |
| 2,358,783 | Best | Sept. 26, 1944 |